United States Patent [19]
Zhao et al.

[11] Patent Number: 6,008,318
[45] Date of Patent: Dec. 28, 1999

[54] TWO-STAGE SOLUTION POLYMERIZATION OF HIGH MOLECULAR WEIGHT POLY (PHOSPHOESTERS)

[75] Inventors: Zhong Zhao, Ellicott City; Hai-quan Mao, Towson; Kam W. Leong, Ellicott City, all of Md.

[73] Assignees: Guilford Pharmaceuticals Inc.; Johns Hopkins University, both of Baltimore, Md.

[21] Appl. No.: 09/098,620

[22] Filed: Jun. 17, 1998

Related U.S. Application Data

[63] Continuation of application No. 08/877,624, Jun. 18, 1997, abandoned.
[51] Int. Cl.$^6$ .................................................. C08G 79/02
[52] U.S. Cl. ........................................... 528/398; 528/400
[58] Field of Search ...................................... 528/398, 400

[56] References Cited

U.S. PATENT DOCUMENTS

| | | | |
|---|---|---|---|
| 5,194,581 | 3/1993 | Leong | 528/398 |
| 5,256,265 | 10/1993 | Leong | 528/398 |

FOREIGN PATENT DOCUMENTS

| | | |
|---|---|---|
| 0386757 | 9/1990 | European Pat. Off. . |
| 50-021093 | 3/1975 | Japan . |

OTHER PUBLICATIONS

Mao et al., "Synthesis and Biological Properties of Polymer Immunoadjuvants", *Polymer Journal,* 25:5, 499–505 (11993).

Luo et al., "Syntheis and Antitumor Activity of Biodegradable Poly–Phosphamides", *Chemical Abstracts*, 122:11, Abstract No. 122613 (Mar. 13, 1995).

Fan et al., "Studies on the Drug Controlled Release of Materials of Polyphosphate Containing Tyrosine Ester," *Chemical Abstracts*, 124:18, Abstract No. 241898 (Apr. 18, 1996).

Penczek et al., *Handbook of Polymer Syntheis,* Chapter 17: "Phosphorus–Containing Polymers", (Hans R. Kircheldorf ed., 1992).

*Primary Examiner*—Duc Truong
*Attorney, Agent, or Firm*—Howrey & Simon

[57] ABSTRACT

A process for making a phosphoester polymer comprising the recurring monomeric units of formula I:

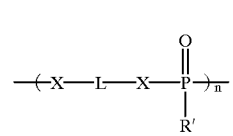

wherein:
X is —O— or —NR"—, where R" is H or alkyl;
L is a divalent organic moiety;
R' is H, alkyl, alkoxy, aryl, aryloxy, heterocyclic, or heterocycloxy; and
n is between about 25 to 2,000,
is described. The process comprises the steps of:

(a) polymerizing in the presence of a solvent p moles of a di-XH compound having formula II:

$$H—X—L—X—H \qquad II$$

wherein X and L are as defined above, with q moles, where p≈q, of a phosphorodihalo compound to form a polymer of formula I, wherein n is about 12 to 1000, having a first molecular weight $Mw_1$, wherein the solvent is present in an amount greater than about 5 ml of solvent per gram of compound of formula II;

(b) removing at least about 25% of the solvent to form a more concentrated reaction mixture; and (c) further polymerizing the concentrated reaction mixture for an additional time sufficient to produce a polymer of formula I wherein n is between about 25 and 2,000, the polymer having a second molecular weight $Mw_2$, which is significantly higher than $Mw_1$.

38 Claims, 4 Drawing Sheets

TWO-STAGE SOLUTION POLYMERIZATION OF HIGH MOLECULAR WEIGHT POLY (PHOSPHOESTERS)

This application is a Continuation of U.S. patent application Ser. No. 08/877,624, filed Jun. 18, 1997 abandoned, the contents of which are incorporated herein in their entirety.

BACKGROUND OF THE INVENTION

1. Field of the Invention

The present invention relates to a solution polymerization process for making high molecular weight polymers containing phosphoester linkages, in particular those that degrade in vivo into non-toxic residues. The polymers made by the process of the invention are particularly useful as implantable medical devices and prolonged release drug delivery systems.

2. Description of the Prior Art

Polymers having phosphate linkages, called poly (phosphates), poly(phosphonates) and poly(phosphites), are known. See Penczek et al., *Handbook of Polymer Synthesis* Chapter 17: "Phosphorus-Containing Polymers", (Hans R. Kricheldorf ed., 1992). The respective structures of these three classes of compounds, each having a different side chain connected to the phosphorus atom, is as follows:

The versatility of these polymers comes from the versatility of the phosphorus atom, which is known for a multiplicity of reactions. Its bonding can involve the 3p orbitals or various 3s-3p hybrids; spd hybrids are also possible because of the accessible d orbitals. Thus, the physico-chemical properties of the poly(phosphoesters) can be readily changed by varying either the R or R' group. The biodegradability of the polymer is due primarily to the physiologically labile phosphoester bond in the backbone of the polymer. By manipulating the backbone or the side chain, a wide range of biodegradation rates are attainable.

An additional feature of poly(phosphoesters) is the availability of functional side groups. Because phosphorus can be pentavalent, drug molecules or other biologically active substances can be chemically linked to the polymer. For example, drugs with —O-carboxy groups may be coupled to the phosphorus via an ester bond, which is hydrolyzable. The P—O—C group in the backbone also lowers the glass transition temperature of the polymer and, importantly, confers solubility in common organic solvents, which is desirable for easy characterization and processing.

The most common general reaction in preparing poly (phosphates) is a dehydrochlorination between a phosphorodichloridate and a diol according to the following equation:

Most poly(phosphonates) are also obtained by condensation between appropriately substituted dichlorides and diols.

Poly(phosphites) have been prepared from glycols in a two-stage condensation reaction. A 20% molar excess of a dimethylphosphite is used to react with the glycol, followed by the removal of the methoxyphosphonyl end groups in the oligomers by high temperature.

A Friedel-Crafts reaction can also be used to synthesize poly(phosphates). Polymerization typically is effected by reacting either bis(chloromethyl) compounds with aromatic hydrocarbons or chloromethylated diphenyl ether with triaryl phosphates. Poly(phosphates) can also be obtained by bulk condensation between phosphorus diimidazolides and aromatic diols, such as resorcinol and quinoline, usually under nitrogen or some other inert gas.

High molecular weights have generally been possible by bulk polycondensation. However, rigorous conditions are often required, which can lead to chain acidolysis (or hydrolysis if water is present). Unwanted, thermally-induced side reactions, such as cross-linking reactions, can also occur if the polymer backbone is susceptible to hydrogen atom abstraction or oxidation with subsequent macro-radical recombination.

To minimize these side reactions, the polymerization can also be carried out in solution. For example, Kobayashi et al., U.S. Pat. No. 4,923,951, teaches that a suitably-diluted concentration in the solvent should be chosen to prevent the viscosity of the reaction mixture from increasing so much that stirring becomes no longer feasible. See Kobayashi et al., column 5, lines 10–13. Solution polycondensation requires that both the diol and the phosphorus component be soluble in a common solvent. Typically, a chlorinated organic solvent is used, such as chloroform, dichloromethane, or dichloroethane. The solution polymerization must be run in the presence of equimolar amounts of the reactants and a stoichiometric amount of an acid acceptor, usually a tertiary amine such as pyridine or triethylamine. The product is then typically isolated from the solution by precipitation with a non-solvent and purified to remove the hydrochloride salt by conventional techniques known to those of ordinary skill in the art, such as by washing with an aqueous acidic solution, e.g., dilute HCl.

A wide variety of solution polymerization procedures have been proposed to influence the polymerization rate, the molecular weight or the physical form of the final polymer products of a polycondensation reaction. For example, one-stage low-solvent polymerizations have been used to increase the molecular weight of fluorine-containing polyimides (Vora, U.S. Pat. No. 4,954,609; 8–12% by weight monomers in inert solvent also produces narrow polydispersity for better processing) or to increase polymerization velocity in making alkylene oxide polymers (Tanaka et al., U.S. Pat. No. 3,876,564). Raising the temperature and water content of the reaction mixture in a two-stage polymerization has been used to increase the molecular weight of poly(arylene thioether-ketone) compounds (Kawakami et al., U.S. Pat. No. 5,312,894).

A reaction medium comprising both a good solvent and a poor solvent has been used in the polymerization of epoxides to form granular polymers (Carville et al., U.S. Pat. No. 4,650,853), and the addition of a poor solvent, which comprises 30–60% by weight of the total solvent in a subsequent stage of polymerization, has been used to increase molecular weight in polyarylene sulfides (Tanaka et al., U.S. Pat. No. 5,130,411). Parekh, U.S. Pat. No. 4,417,044, discloses a process for making poly(etherimide) comprising (a) forming a prepolymer-solvent mixture; (b) removal of water, and thus solvent, to form a "prepolymer"; and (c) heating the "prepolymer" to form the poly (etherimide). See column 2, lines 29–44. In the second step, the continuous forming and reforming of a thin film typically permits the concentration of viscous materials. In the final process step, substantially complete polymerization, as well as the removal of both water and solvent, are said to occur. The second and third steps may be combined, for example, if the "prepolymer" is retained in a thin-film evaporator beyond the point at which a substantial portion of the solvent is removed, thus effecting what is described as "substantially complete polymerization." See column 7, lines 33–35 and 57–65.

Dellacoletta, U.S. Pat. No. 5,262,516, discloses a similar process for preparing a poly(etherimide)-poly(imide) copolymer by (a) forming an oligomer-solvent mixture; (b) removing unreacted organic diamine from the oligomer-solvent mixture; and (c) reacting an aromatic dianhydride with the oligomer in an inert, non-polar solvent. See column 2, lines 5–11. The second step, called a devolatilization process, is said to "fully" polymerize the oligomer to form a molten poly(etherimide) and, in the process, also removes solvent. See column 8, lines 60–63.

However, neither Parekh nor Dellacoletta suggest that solvent removal should be done to increase molecular weight. Further, none of the above variations has yet been applied to the formation of high molecular weight poly (phosphoesters).

Reaction times tend to be longer with solution polymerization than with bulk polymerization. However, because overall milder reaction conditions can be used, side reactions are minimized, and more sensitive functional groups can be incorporated into the polymer. The disadvantage of solution polymerization is that the attainment of high molecular weights, such as a molecular weight greater than about 10,000 to 20,000, is less likely.

Interfacial polycondensation can be used when high molecular weight polymers are desired at high reaction rates. Mild conditions minimize side reactions. Also the dependence of high molecular weight on stoichiometric equivalence between diol and dichloridate inherent in solution methods is removed. However, hydrolysis of the acid chloride may occur in the alkaline aqueous phase, since sensitive dichloridates that have some solubility in water are generally subject to hydrolysis rather than polymerization.

Thus, there remains a need for a polymerization procedure that will minimize the side-reactions usually obtained with the bulk polymerizations and/or polymerizations conducted at high temperatures thought to be necessary to achieve high molecular weights. At the same time, however, there is a need to provide significantly higher molecular weight materials than would be produced with a standard one-stage solution polymerization reaction.

SUMMARY OF THE INVENTION

The process of the invention is for preparing a phosphoester polymer comprising the recurring monomeric units of formula I:

wherein:

X is —O— or —NR″—, where R″ is H or alkyl;

L is a divalent organic moiety;

R′ is H, alkyl, alkoxy, aryl, aryloxy, heterocyclic, or heterocycloxy; and n is between about 25 to 2,000.

The process of the invention comprises the steps of:

(a) polymerizing in the presence of a solvent p moles of a di-XH compound having formula II:

wherein X and L are as defined above, with q moles, where p≈q, of a phosphorodihalo compound of formula III:

wherein R′ is defined as above and "halo" is Br, Cl or I, to form a polymer of formula I, wherein n is about 12 to 1,000, having a first molecular weight $Mw_1$, wherein the solvent is present in an amount greater than about 5 ml of solvent per gram of compound of formula II;

(b) removing at least about 25% of the solvent to form a more concentrated reaction mixture; and (c) further polymerizing the concentrated reaction mixture for an additional time sufficient to produce a polymer of formula I where n is between about 25 and 2,000, the polymer having a second molecular weight $Mw_2$, which is significantly higher than $Mw_1$.

In another embodiment, the invention comprises the high molecular weight phosphoester polymer made by the above-described process.

DETAILED DESCRIPTION OF THE INVENTION

Polymers of the Invention

As used herein, the term "aliphatic" refers to a linear, branched, or cyclic alkane, alkene, or alkyne. Preferred aliphatic groups in the poly(phosphate) polymer of the invention are linear or branched alkanes having from 1 to 10 carbons, preferably being linear alkane groups having from 1 to 7 carbon atoms.

As used herein, the term "aromatic" refers to an unsaturated cyclic carbon compound with 4n+2 π electrons.

As used herein, the term "heterocyclic" refers to a saturated or unsaturated ring compound having one or more atoms other than carbon in the ring, for example, nitrogen, oxygen or sulfur.

The polymer of the invention comprises the recurring monomeric units shown in formula I:

I wherein X is —O— or —NR''—, where R'' is H or alkyl such as methyl, ethyl, isopropyl or tert-butyl. Preferably, X is —O—.

L in formula I can be any divalent organic moiety so long as it does not interfere with the polymerization reaction of the corresponding monomer. Preferably, L comprises an aromatic ring, an aliphatic ring, a straight-chain or branched aliphatic group, or a carbonyl group. Specifically, L can contain an aliphatic group, for example, alkylene, such as ethylene, 1,2-dimethylethylene, n-propylene, isopropylene, 2,2-dimethylpropylene or tert-butylene, tert-pentylene, n-hexylene, n-heptylene and the like; an alkylene group substituted with a non-interfering substituent, for example, halogen-substituted alkylene; or a cycloaliphatic group such as cyclopentylene, 2-methylcyclopentylene, cyclohexylene, cyclohexenylene and the like.

L can contain a divalent aromatic group, such as phenylene, benzylene, naphthalene, phenanthrenylene, and the like, or a divalent aromatic group substituted with a non-interfering substituent. L can also include a divalent heterocyclic group, such as pyrrolylene, furanylene, thiophenylene, alkylene-pyrrolylene-alkylene, pyridylene, pyrazinylene, pyrimidinylene and the like, or any of these groups substituted with a non-interfering substituent.

Even more preferably, however, L is selected from the group consisting of:

and

-continued wherein R is branched or straight-chain alkylene, and R''' is H, alkyl, aryl or heterocyclyl. Preferably, R is an alkylene group having from 1 to 7 carbon atoms and, most preferably, R is selected from the group consisting of ethylene, and 2,2-dimethyl propylene.

R' in formula I is H, alkyl, alkoxy, aryl, aryloxy, heterocyclic, or heterocycloxy. Examples of useful alkyl groups include methyl, ethyl, n-propyl, i-propyl, n-butyl, tert-butyl, —$C_8H_{17}$, and the like. Also included by "alkyl" are alkyl groups that are substituted with a non-interfering substituent, such as halogen, or alkyl conjugated to a biologically active substance to form a pendant drug delivery system.

When R' is aromatic, it typically contains from about 5 to about 14 carbon atoms, preferably about 5 to 12 carbon atoms and, optionally, can contain one or more rings that are fused to each other. Examples of particularly suitable aromatic groups include phenyl, naphthyl, anthracenyl, phenanthrenyl and the like.

When R' is heterocyclic, it typically contains from about 5 to 14 ring atoms, preferably from about 5 to 12 ring atoms, and one or more heteroatoms. Examples of suitable heterocyclic groups include furan, thiophene, pyrrole, isopyrrole, 3-isopyrrole, pyrazole, 2-isoimidazole, 1,2,3-triazole, 1,2,4-triazole, oxazole, thiazole, isothiazole, 1,2,3-oxadiazole, 1,2,4-oxadiazole, 1,2,5-oxadiazole, 1,3,4-oxadiazole, 1,2,3,4-oxatriazole, 1,2,3,5-oxatriazole, 1,2,3-dioxazole, 1,2,4-dioxazole, 1,3,2-dioxazole, 1,3,4-dioxazole, 1,2,5-oxatriazole, 1,3-oxathiole, 1,2-pyran, 1,4-pyran, 1,2-pyrone, 1,4-pyrone, 1,2-dioxin, 1,3-dioxin, pyridine, N-alkyl pyridinium, pyridazine, pyrimidine, pyrazine, 1,3,5-triazine, 1,2,4-triazine, 1,2,3-triazine, 1,2,4-oxazine, 1,3,2-oxazine, 1,3,5-oxazine, 1,4-oxazine, o-isoxazine, p-isoxazine, 1,2,5-oxathiazine, 1,2,6-oxathiazine, 1,4,2-oxadiazine, 1,3,5,2-oxadiazine, azepine, oxepin, thiepin, 1,2,4-diazepine, indene, isoindene, benzofuran, isobenzofuran, thionaphthene, isothionaphthene, indole, indolenine, 2-isobenzazole, 1,4-pyrindine, pyrando[3,4-b]-pyrrole, isoindazole, indoxazine, benzoxazole, anthranil, 1,2-benzopyran, 1,2-benzopyrone, 1,4-benzopyrone, 2,1-benzopyrone, 2,3-benzopyrone, quinoline, isoquinoline, 1,2,-benzodiazine, 1,3-benzodiazine, naphthyridine, pyrido[3,4-b]-pyridine, pyrido[3,2-b]-pyridine, pyrido[4,3-b] pyridine, 1,3,2-benzoxazine, 1,4,2-benzoxazine, 2,3,1-benzoxazine, 3,1,4-benzoxazine, 1,2-benzisoxazine, 1,4-benzisoxazine, carbazole, xanthene, acridine, purine, and the like. Preferably, when R' is heterocyclic, it is selected from the group consisting of furan, pyridine, N-alkylpyridine, 1,2,3- and 1,2,4-triazoles, indene, anthracene and purine.

In a particularly preferred embodiment, R' is an alkoxy group or a phenoxy group and, even more preferably, an alkoxy group having from 1 to 7 carbon atoms. Most preferably, R' is an ethoxy group or a hexyloxy group.

Preferably, the polymers of the invention are biodegradable, i.e., they can be degraded by the body during in vivo therapy. This generally involves breaking down the polymer into its monomeric subunits. In principle, the ultimate hydrolytic breakdown products are typically phosphate, an alcohol, and a diol, all of which are potentially non-toxic. The intermediate oligomeric products of the hydrolysis may have different properties, but the toxicology of a biodegradable polymer intended for implantation or injection, even one synthesized from apparently innocuous monomeric structures, is typically determined after one or more in vitro toxicity analyses.

The polymer of the invention is preferably sufficiently pure to be biocompatible itself and remains biocompatible upon biodegradation. By "biocompatible" is meant that the biodegradation products of the polymer are non-toxic and result in only minimal tissue irritation when implanted or injected into vasculated tissue.

The polymer of the invention is preferably soluble in one or more common organic solvents for ease of fabrication and processing. Common organic solvents include solvents such as chloroform, dichloromethane, acetone, ethyl acetate, DMAC, N-methyl pyrrolidone, dimethylformamide, and dimethylsulfoxide. The polymer is preferably soluble in at least one of the above solvents.

Polymerization Process

In the process of the invention, the polymer of formula I prepared in a method comprising the steps of:

(a) polymerizing in the presence of a solvent p moles of a di-XH compound having formula II:

wherein X and L are as defined above, with q moles, where p≈q, of a phosphorodihalo compound of formula III:

wherein R' is defined as above and "halo" is Br, Cl or I, to form a polymer of formula I, wherein n is about 12 to 1,000, having a first molecular weight $Mw_1$, wherein said solvent is present in an amount greater than about 5 ml of solvent per gram of compound of formula II;

(b) removing at least about 25% of the solvent to form a more concentrated reaction mixture; and (c) further polymerizing said concentrated reaction mixture for an additional time sufficient to produce a polymer of formula I where n is between about 25 and 2,000, said polymer having a second molecular weight $Mw_2$, which is significantly higher than $Mw_1$.

The function of the polymerization step (a) is thought to phosphorylate the di-XH starting material of formula II with the phosphorodihalo compound of formula III to form low molecular weight poly(phosphoesters). Uniform distribution of the reactants relative to each other and the avoidance of undesirable side reactions is particularly important during step (a) of the reaction.

Useful solvents include halogenated solvents such as dichloroethane, dichloromethane, chloroform, toluene, or any of a wide variety of other organic solvents. A useful set of parameters for selecting a suitable solvent includes:

1. Inertness to the polymerization reaction;
2. Good solubility for reactants and any catalysts used in the polymerization.
3. Low water content, since some poly(phosphoester) compounds are sensitive to moisture.
4. Relatively high boiling point so that the polymerization reaction may be performed at elevated temperature if advantageous.
5. Low solubility of salts formed during the polymerization reaction to drive the reaction further to completion.

Also, if the polymer of the invention is to be used within the body, any solvent selected for the polymerization reaction should also exhibit low toxicity or be easily removed from the polymer product.

The amount of solvent typically used in such polymerization reactions can vary widely but is usually greatly in excess of the molar amounts of the reactants present to ensure uniform distribution of the reactants. For example, the amount of solvent generally exceeds 5 ml for each gram of the di-XH starting compound of formula II. Preferably, sufficient solvent is used to assure that there will be between 5 and 15 ml of solvent per gram of compound of formula II.

Because the process of the invention is a polycondensation reaction in which an acid is generally produced as a by-product, e.g. HCl, an acid acceptor is advantageously present during the polymerization step (a). A particularly suitable class of acid acceptors comprises tertiary amines, such as pyridine, trimethylamine, triethylamine, substituted anilines and substituted aminopyridines. The most preferred acid acceptor is the substituted aminopyridine 4-dimethylaminopyridine ("DMAP").

The polymerization step (a) can take place at widely varying temperatures, depending upon the solvent used, the molecular weight desired, and the susceptibility of the reactants to form side reactions. Preferably, however, the polymerization step (a) takes place at a temperature ranging from about $-40°$ C. to about $150°$ C., preferably from about $0°$ C. to $110°$ C.

The time required for the polymerization step (a) also can vary widely, depending on the solvent being used and the molecular weight desired. As the reaction continues, it can be monitored by GPC and is preferably continued until the molecular weight levels off to a first relatively constant value, $Mw_1$. Preferably, this first polymerization step (a) takes place during a time between about 30 minutes and 24 hours.

The purpose of the solvent removal step (b) is to reduce by at least about 25%, preferably about 25–80%, the amount of solvent present and to form a more concentrated reaction mixture. Typically, the viscosity is significantly increased to form a reaction mixture having a flowable paste-like consistency. Preferably, the amount of solvent is reduced to a level of about 0.1–7.5 ml, preferably 0.5–5 ml, of solvent per gram of formula II compound, which was used in the first-stage polymerization, step (a).

The solvent removal step (b) may be accomplished by any of the usual methods, such as distillation at room temperature or above, rotary evaporation under reduced pressure or atmospheric pressure, removal of vaporized materials by evaporation in a high-air flow hood, and the like. Preferably, the solvent is removed by distillation at a temperature between room temperature and the reflux temperature of the solvent.

Once the amount of solvent has been reduced, a second-stage polymerization step (c) is used to increase the first molecular weight obtained in the first-stage polymerization step (a), $Mw_1$, thus achieving a second, significantly higher molecular weight value, $Mw_2$. Sufficient mixing of the concentrated reaction mixture during this second-stage polymerization is important to enhance the diffusion necessary for chain growth of the existing polymers. Mixing is usually supplied by a mechanical stirrer such as a stirring bar or a stirring paddle, but other types of mixing, such as sonication, shaking, swirling or maintaining the reaction mixture at reflux temperature with a boiling chip, can also be used.

The second-stage polymerization step (c) of the invention usually takes place at a slightly higher temperature than the temperature of the first-stage polymerization of step (a), but it also may vary widely, depending upon the nature of the monomers being polymerized, the presence of one or more catalysts, the molecular weight desired, and the susceptibility of the reactants to undesirable side reactions. Preferably, the second-stage polymerization step (c) takes place at a temperature between about room temperature and 150° C. at atmospheric pressure.

The time required for the second-stage polymerization step (c) can also vary, depending upon the need to use more or less rigorous conditions for the reaction to proceed to the desired degree of completion. The second-stage polymerization step (c) can be monitored by GPC to follow the increase in molecular weight, until it stabilizes at a second, significantly higher value, $Mw_2$. When the amount of solvent has been reduced in step (b), the higher molecular weight is achieved in a relatively short time. For example, second-stage polymerization times between about 30 minutes and 10 hours, preferably, 1 to 5 hours, are common.

The increase in molecular weight as a result of the process of the invention is significant. $Mw_2$ is often at least 25% greater than $Mw_1$, preferably at least 50% greater than $Mw_1$ and, even more preferably, at least 100% greater (two times greater). The actual molecular weights achieved with different phosphoester polymers can vary greatly, depending upon the monomers selected, the times and temperatures used for polymerization, the presence of one or more co-monomers, the choice of an appropriate solvent, and the like.

Typically, however, $Mw_1$ varies between about 2,000 and 60,000 daltons, as measured by GPC, while $Mw_2$ typically varies between about 4,000 and 120,000 daltons, as measured by GPC. Preliminary experiments determining the molecular weight of these polymers by light scattering methods indicate higher molecular weight values than when measured by GPC, up to about 3 times the GPC-determined value.

However, what is significant is that $Mw_2$ is always significantly higher than $Mw_1$ when determined by the same method. Further, contrary to the teachings in the art that removal of solvent to achieve higher molecular weight poly(phosphoesters) is accompanied by the formation of additional side-products, i.e., in bulk or melt polymerizations, the second-stage polymerization step of the invention using a reduced amount of solvent unexpectedly produces a higher molecular weight in short reaction times and under mild conditions without the formation of unwanted side-reactions.

The precise mechanism by which this unexpectedly higher molecular weight $Mw_2$ in steps (b) and (c) is achieved is not clear. One possible explanation is that the halo-acid by-product, e.g., HCl, which is produced as a result of the reaction of (1) the di-XH compound of formula II with (2) the phosphorodihalo compound of formula III, may react with the acid acceptor, when used, to form a salt. This salt is usually soluble to a limited degree in the organic solvent, so that, when the amount of solvent is reduced in step (b), it may tend to "salt out" of the reaction mixture to a greater extent. The removal of larger amounts of the salt by-product from the reaction mixture by precipitation may be driving the reaction further to completion.

It is also possible that the decreasing solubility of the steadily growing polymer chains drives the reaction to a greater degree of completion. Further, it is possible that a more concentrated solution of the polymer mixture mimics bulk polymerization conditions by bringing the growing chains into more intimate contact with each other during the second polymerization stage. Still further, it is possible that none of the above mechanisms are correct.

The polymer of formula I can be isolated from the reaction mixture by conventional techniques, such as by precipitating out, extraction with an immiscible solvent, evaporation, filtration, crystallization and the like. Typically, however, the reaction mixture is washed one or more times with a salt solution, such as a saturated NaCl solution to remove the neutralized acid by-product discussed above, and the polymer of formula I can then be isolated and purified by quenching with a non-solvent or a partial solvent, such as diethyl ether or petroleum ether.

The process of the invention can be carried out on a batchwise or continuous basis.

Polymer Compositions

The polymer of formula I can be used either alone or as a composition containing, in addition, a biologically active substance to form a variety of useful biodegradable materials. For example, the polymer of formula I can be used to produce a biosorbable suture, an orthopedic appliance or a bone cement for repairing injuries to bone or connective tissue, a laminate for degradable or non-degradable fabrics, or a coating for an implantable device, even without the presence of a biologically active substance.

Preferably, however, the polymer composition of the invention comprises a biologically active substance as well as the polymer of the invention.

The biologically active substance of the invention can vary widely with the purpose for the composition. The active substance(s) may be described as a single entity or a combination of entities. The delivery system is designed to be used with biologically active substances having high water-solubility as well as with those having low water-solubility to produce a delivery system that has controlled release rates. The term "biologically active substance" includes without limitation, medicaments; vitamins; mineral supplements; substances used for the treatment, prevention, diagnosis, cure or mitigation of disease or illness; or substances which affect the structure or function of the body; or pro-drugs, which become biologically active or more active after they have been placed in a predetermined physiological environment.

Non-limiting examples of broad categories of useful biologically active substances include the following expanded therapeutic categories: anabolic agents, antacids, anti-asthmatic agents, anti-cholesterolemic and anti-lipid agents, anti-coagulants, anti-convulsants, anti-diarrheals, anti-emetics, anti-infective agents, anti-inflammatory agents, anti-manic agents, anti-nauseants, anti-neoplastic agents, anti-obesity agents, anti-pyretic and analgesic agents, anti-spasmodic agents, anti-thrombotic agents, anti-uricemic agents, anti-anginal agents, antihistamines, anti-tussives, appetite suppressants, biologicals, cerebral dilators, coronary dilators, decongestants, diuretics, diagnostic agents, erythropoietic agents, expectorants, gastrointestinal sedatives, hyperglycemic agents, hypnotics, hypoglycemic agents, ion exchange resins, laxatives, mineral supplements, mucolytic agents, neuromuscular drugs, peripheral vasodilators, psychotropics, sedatives, stimulants, thyroid and anti-thyroid agents, uterine relaxants, vitamins, and prodrugs.

Specific examples of useful biologically active substances from the above categories include: (a) anti-neoplastics such as androgen inhibitors, antimetabolites, cytotoxic agents, and immunomodulators; (b) anti-tussives such as dextromethorphan, dextromethorphan hydrobromide, noscapine, carbetapentane citrate, and chlorphedianol hydrochloride; (c) antihistamines such as chlorpheniramine maleate, phenindamine tartrate, pyrilamine maleate, doxylamine succinate, and phenyltoloxamine citrate; (d) decongestants such as phenylephrine hydrochloride, phenylpropanolamine hydrochloride, pseudoephedrine hydrochloride, and ephedrine; (e) various alkaloids such as codeine phosphate, codeine sulfate and morphine; (f) mineral supplements such as potassium chloride, zinc chloride, calcium carbonates, magnesium oxide, and other alkali metal and alkaline earth metal salts; (g) ion exchange resins such as cholestryramine; (h) anti-arrhythmics such as N-acetylprocainamide; (i) antipyretics and analgesics such as acetaminophen, aspirin and ibuprofen; (j) appetite suppressants such as phenyl-propanolamine hydrochloride or caffeine; (k) expectorants such as guaifenesin; (l) antacids such as aluminum hydroxide and magnesium hydroxide; (m) biologicals such as peptides, polypeptides, proteins and amino acids, hormones, interferons or cytokines and other bioactive peptidic compounds, such as hGH, tPA, calcitonin, ANF, EPO and insulin; and (n) anti-infective agents such as antifungals, anti-virals, antiseptics and antibiotics.

More specifically, non-limiting examples of useful biologically active substances include the following therapeutic categories: analgesics, such as nonsteroidal anti-inflammatory drugs, opiate agonists and salicylates; antihistamines, such as $H_1$-blockers and $H_2$-blockers; anti-infective agents, such as anthelmintics, antianaerobics, antibiotics, aminoglycoside antibiotics, antifungal antibiotics, cephalosporin antibiotics, macrolide antibiotics, miscellaneous β-lactam antibiotics, penicillin antibiotics, quinolone antibiotics, sulfonamide antibiotics, tetracycline antibiotics, antimycobacterials, antituberculosis antimycobacterials, antiprotozoals, antimalarial antiprotozoals, antiviral agents, anti-retroviral agents, scabicides, and urinary anti-infectives; antineoplastic agents, such as alkylating agents, nitrogen mustard aklylating agents, nitrosourea alkylating agents, antimetabolites, purine analog antimetabolites, pyrimidine analog antimetabolites, hormonal antineoplastics, natural antineoplastics, antibiotic natural antineoplastics, and vinca alkaloid natural antineoplastics; autonomic agents, such as anticholinergics, antimuscarinic anticholinergics, ergot alkaloids, parasympathomimetics, cholinergic agonist parasympathomimetics, cholinesterase inhibitor parasympathomimetics, sympatholytics, α-blocker sympatholytics, β-blocker sympatholytics, sympathomimetics, and adrenergic agonist sympathomimetics; cardiovascular agents, such as antianginals, β-blocker antianginals, calcium-channel blocker antianginals, nitrate antianginals, antiarrhythmics, cardiac glycoside antiarrhythmics, class I antiarrhythmics, class II antiarrhythmics, class III antiarrhythmics, class IV antiarrhythmics, antihypertensive agents, α-blocker antihypertensives, angiotensin-converting enzyme inhibitor (ACE inhibitor) antihypertensives, β-blocker antihypertensives, calcium-channel blocker antihypertensives, central-acting adrenergic antihypertensives, diuretic antihypertensive agents, peripheral vasodilator antihypertensives, antilipemics, bile acid sequestrant antilipemics, HMG-COA reductase inhibitor antilipemics, inotropes, cardiac glycoside inotropes, and thrombolytic agents; dermatological agents, such as antihistamines, anti-inflammatory agents, corticosteroid anti-inflammatory agents, antipruritics/local anesthetics, topical anti-infectives, antifungal topical anti-infectives, antiviral topical anti-infectives, and topical antineoplastics; electrolytic and renal agents, such as acidifying agents, alkalinizing agents, diuretics, carbonic anhydrase inhibitor diuretics, loop diuretics, osmotic diuretics, potassium-sparing diuretics, thiazide diuretics, electrolyte replacements, and uricosuric agents; enzymes, such as pancreatic enzymes and thrombolytic enzymes; gastrointestinal agents, such as antidiarrheals, antiemetics, gastrointestinal anti-inflammatory agents, salicylate gastrointestinal anti-inflammatory agents, antacid anti-ulcer agents, gastric acid-pump inhibitor anti-ulcer agents, gastric mucosal anti-ulcer agents, $H_2$-blocker anti-ulcer agents, cholelitholytic agents, digestants, emetics, laxatives and stool softeners, and prokinetic agents; general anesthetics, such as inhalation anesthetics, halogenated inhalation anesthetics, intravenous anesthetics, barbiturate intravenous anesthetics, benzodiazepine intravenous anesthetics, and opiate agonist intravenous anesthetics; hematological agents, such as antianemia agents, hematopoietic antianemia agents, coagulation agents, anticoagulants, hemostatic coagulation agents, platelet inhibitor coagulation agents, thrombolytic enzyme coagulation agents, and plasma volume expanders; hormones and hormone modifiers, such as abortifacients, adrenal agents, corticosteroid adrenal agents, androgens, anti-androgens, antidiabetic agents, sulfonylurea antidiabetic agents, antihypoglycemic agents, oral contraceptives, progestin contraceptives, estrogens, fertility agents, oxytocics, parathyroid agents, pituitary hormones, progestins, antithyroid agents, thyroid hormones, and tocolytics; immunobiologic agents, such as immunoglobulins, immunosuppressives, toxoids, and vaccines; local anesthetics, such as amide local anesthetics and ester local anesthetics; musculoskeletal agents, such as anti-gout anti-inflammatory agents, corticosteroid anti-inflammatory agents, gold compound anti-inflammatory agents, immunosuppressive anti-inflammatory agents, nonsteroidal anti-inflammatory drugs (NSAIDs), salicylate anti-inflammatory agents, skeletal muscle relaxants, neuromuscular blocker skeletal muscle relaxants, and reverse neuromuscular blocker skeletal muscle relaxants; neurological agents, such as anticonvulsants, barbiturate anticonvulsants, benzodiazepine anticonvulsants, anti-mirgraine agents, anti-parkinsonian agents, anti-vertigo agents, opiate agonists, and opiate antagonists; ophthalmic agents, such as anti-glaucoma agents, β-blocker anti-gluacoma agents, miotic anti-glaucoma agents, mydriatics, adrenergic agonist mydriatics, antimuscarinic mydriatics, ophthalmic anesthetics, ophthalmic anti-infectives, ophthalmic aminoglycoside anti-infectives, ophthalmic macrolide anti-infectives, ophthalmic quinolone anti-infectives, ophthalmic sulfonamide anti-infectives, ophthalmic tetracycline anti-infectives, ophthalmic anti-inflammatory agents, ophthalmic corticosteroid anti-infammatory agents, and ophthalmic nonsteroidal anti-infammatory drugs (NSAIDs); psychotropic agents, such as antidepressants, heterocyclic antidepressants, monoamine oxidase inhibitors (MAOIs), selective serotonin re-uptake inhibitors (SSRIs), tricyclic antidepressants, antimanics, antipsychotics, phenothiazine antipsychotics, anxiolytics, sedatives, and hypnotics, barbiturate sedatives and hypnotics, benzodiazepine anxiolytics, sedatives, and hypnotics, and psychostimulants; respiratory agents, such as antitussives, bronchodilators, adrenergic agonist bronchodilators, antimuscarinic bronchodilators, expectorants, mucolytic agents, respiratory anti-infammatory agents, and respiratory corticosteroid anti-infammatory agents; toxicology agents, such as antidotes, heavy metal antagonists/chelating agents, substance abuse agents, deterrent substance abuse agents, and withdrawal substance abuse agents; minerals; and vitamins, such as vitamin A, vitamin B, vitamin C, vitamin D, vitamin E, and vitamin K.

Preferred classes of useful biologically active substances from the above categories include: (1) nonsteroidal anti-inflammatory drugs (NSAIDs) analgesics, such as diclofenac, ibuprofen, ketoprofen, and naproxen; (2) opiate agonist analgesics, such as codeine, fentanyl, hydromorphone, and morphine; (3) salicylate analgesics, such as aspirin (ASA) (enteric coated ASA); (4) $H_1$-blocker antihistamines, such as clemastine and terfenadine; (5) $H_2$-blocker antihistamines, such as cimetidine, famotidine, nizadine, and ranitidine; (6) anti-infective agents, such as mupirocin; (7) antianaerobic anti-infectives, such as chloramphenicol and clindamycin; (8) antifungal antibiotic anti-infectives, such as amphotericin b, clotrimazole, fluconazole, and ketoconazole; (9) macrolide antibiotic anti-infectives, such as azithromycin and erythromycin; (10) miscellaneous β-lactam antibiotic anti-infectives, such as aztreonam and imipenem; (11) penicillin antibiotic anti-infective, such as nafcillin, oxacillin, penicillin G, and penicillin V; (12) quinolone antibiotic anti-infectives, such as ciprofloxacin and norfloxacin; (13) tetracycline antibiotic anti-infectives, such as doxycycline, minocycline, and tetracycline; (14) antituberculosis antimycobacterial anti-infectives such as isoniazid (INH), and rifampin; (15) anti-protozoal anti-infectives, such as atovaquone and dapsone; (16) antimalarial antiprotozoal anti-infectives, such as chloroquine and pyrimethamine; (17) anti-retroviral anti-infectives, such as ritonavir and zidovudine; (18) antiviral anti-infective agents, such as acyclovir, ganciclovir, interferon alfa, and rimantadine; (19) alkylating antineoplastic agents, such as carboplatin and cisplatin; (20) nitrosourea alkylating antineoplastic agents, such as carmustine (BCNU); (21) antimetabolite antineoplastic agents, such as methotrexate; (22) pyrimidine analog antimetabolite antineoplastic agents, such as fluorouracil (5-FU) and gemcitabine; (23) hormonal antineoplastics, such as goserelin, leuprolide, and tamoxifen; (24) natural antineoplastics, such as aldesleukin, interleukin-2, docetaxel, etoposide (VP-16), interferon alfa, paclitaxel, and tretinoin (ATRA); (25) antibiotic natural antineoplastics, such as bleomycin, dactinomycin, daunorubicin, doxorubicin, and mitomycin; (26) vinca alkaloid natural antineoplastics, such as vinblastine and vincristine; (27) autonomic agents, such as nicotine; (28) anticholinergic autonomic agents, such as benztropine and trihexyphenidyl; (29) antimuscarinic anticholinergic autonomic agents, such as atropine and oxybutynin; (30) ergot alkaloid autonomic agents, such as bromocriptine; (31) cholinergic agonist parasympathomimetics, such as pilocarpine; (32) cholinesterase inhibitor parasympathomimetics, such as pyridostigmine; (33) α-blocker sympatholytics, such as prazosin; (34) β-blocker sympatholytics, such as atenolol; (35) adrenergic agonist sympathomimetics, such as albuterol and dobutamine; (36) cardiovascular agents, such as aspirin (ASA) (enteric coated ASA); (37) β-blocker antianginals, such as atenolol and propranolol; (38) calcium-channel blocker antianginals, such as nifedipine and verapamil; (39) nitrate antianginals, such as isosorbide dinitrate (ISDN); (40) cardiac glycoside antiarrhythmics, such as digoxin; (41) class I antiarrhythmics, such as lidocaine, mexiletine, phenytoin, procainamide, and quinidine; (42) class II antiarrhythmics, such as atenolol, metoprolol, propranolol, and timolol; (43) class III antiarrhythmics, such as amiodarone; (44) class IV antiarrhythmics, such as diltiazem and verapamil; (45) α-blocker antihypertensives, such as prazosin; (46) angiotensin-converting enzyme inhibitor (ACE inhibitor) antihypertensives, such as captopril and enalapril; (47) β-blocker antihypertensives, such as atenolol, metoprolol, nadolol, and propanolol; (48) calcium-channel blocker antihypertensive agents, such as diltiazem and nifedipine; (49) central-acting adrenergic antihypertensives, such as clonidine and methyldopa; (50) diurectic antihypertensive agents, such as amiloride, furosemide, hydrochlorothiazide (HCTZ), and spironolactone; (51) peripheral vasodilator antihypertensives, such as hydralazine and minoxidil; (52) antilipemics, such as gemfibrozil and probucol; (53) bile acid sequestrant antilipemics, such as cholestyramine; (54) HMG-CoA reductase inhibitor antilipemics, such as lovastatin and pravastatin; (55) inotropes, such as amrinone, dobutamine, and dopamine; (56) cardiac glycoside inotropes, such as digoxin; (57) thrombolytic agents, such as alteplase (TPA), anistreplase, streptokinase, and urokinase; (58) dermatological agents, such as colchicine, isotretinoin, methotrexate, minoxidil, tretinoin (ATRA); (59) dermatological corticosteroid anti-inflammatory agents, such as betamethasone and dexamethasone; (60) antifungal topical anti-infectives, such as amphotericin B, clotrimazole, miconazole, and nystatin; (61) antiviral topical anti-infective, such as acyclovir; (62) topical antineoplastics, such as fluorouracil (5-FU); (63) electrolytic and renal agents, such as lactulose; (64) loop diuretics, such as furosemide; (65) potassium-sparing diuretics, such as triamterene; (66) thiazide diuretics, such as hydrochlorothiazide (HCTZ); (67) uricosuric agents, such as probenecid; (68) enzymes such as RNase and DNase; (69) thrombolytic enzymes, such as alteplase, anistreplase, streptokinase and urokinase; (70) antiemetics, such as prochlorperazine; (71) salicylate gastrointestinal anti-infammatory agents, such as sulfasalazine; (72) gastric acid-pump inhibitor anti-ulcer agents, such as omeprazole; (73) $H_2$-blocker anti-ulcer agents, such as cimetidine, famotidine, nizatidine, and ranitidine; (74) digestants, such as pancrelipase; (75) prokinetic agents, such as erythromycin; (76) opiate agonist intravenous anesthetics such as fentanyl; (77) hematopoietic anti-anemia agents, such as erythropoietin, filgrastim (G-CSF), and sargramostim (GM-CSF); (78) coagulation agents, such as antihemophilic factors 1–10 (AHF 1–10); (79) anticoagulants, such as warfarin; (80) thrombolytic enzyme coagulation agents, such as alteplase, anistreplase, streptokinase and urokinase; (81) hormones and hormone modifiers, such as bromocriptine; (82) abortifacients, such as methotrexate; (83) antidiabetic agents, such as insulin; (84) oral contraceptives, such as estrogen and progestin; (85) progestin contraceptives, such as levonorgestrel and norgestrel; (86) estrogens such as conjugated estrogens, diethylstilbestrol (DES), estrogen (estradiol, estrone, and estropipate); (87) fertility agents, such as clomiphene, human chorionic gonadatropin (HCG), and menotropins; (88) parathyroid agents such as calcitonin; (89) pituitary hormones, such as desmopressin, goserelin, oxytocin, and vasopressin (ADH); (90) progestins, such as medroxy-progesterone, norethindrone, and progesterone; (91) thyroid hormones, such as levothyroxine; (92) immunobiologic agents, such as interferon beta-lb and interferon gamma-1b; (93) immunoglobulins, such as immune globulin IM, IMIG, IGIM and immune globulin IV, IVIG, IGIV; (94) amide local anesthetics, such as lidocaine; (95) ester local anesthetics, such as benzocaine and procaine; (96) musculoskeletal corticosteroid anti-inflammatory agents, such as beclomethasone, betamethasone, cortisone, dexamethasone, hydrocortisone, and prednisone; (97) musculoskeletal anti-inflammatory immunosuppressives, such as azathioprine, cyclophosphamide, and methotrexate; (98) musculoskeletal nonsteroidal anti-inflammatory drugs (NSAIDs), such as diclofenac, ibuprofen, ketoprofen, ketorlac, and naproxen; (99) skeletal muscle relaxants, such as baclofen, cyclobenzaprine, and diazepam; (100) reverse neuromuscular blocker skeletal muscle relaxants, such as pyridostigmine; (101) neurological agents, such as nimodipine, riluzole, tacrine and ticlopidine; (102) anticonvulsants, such as carbamazepine, gabapentin, lamotrigine, phenytoin, and valproic acid; (103) barbiturate anticonvulsants, such as phenobarbital and primidone; (104) benzodiazepine anticonvulsants, such as clonazepam, diazepam, and lorazepam; (105) anti-parkisonian agents, such as bromocriptine, levodopa, carbidopa, and pergolide; (106) anti-vertigo agents, such as meclizine; (107) opiate agonists, such as codeine, fentanyl, hydromorphone, methadone, and morphine; (108) opiate antagonists, such as naloxone; (109) β-blocker anti-glaucoma agents, such as timolol; (110) miotic anti-glaucoma agents, such as pilocarpine; (111) ophthalmic aminoglycoside anti-infective, such as gentamicin, neomycin, and tobramycin; (112) ophthalmic quinolone anti-infectives, such as ciprofloxacin, norfloxacin, and ofloxacin; (113) ophthalmic corticosteroid anti-inflammatory agents, such as dexamethasone and prednisolone; (114) ophthalmic nonsteroidal anti-inflammatory drugs (NSAIDs), such as diclofenac; (115) antipsychotics, such as clozapine, haloperidol, and risperidone; (116) benzodiazepine anxiolytics, sedatives and hypnotics, such as clonazepam, diazepam, lorazepam, oxazepam, and prazepam; (117) psychostimulants, such as methylphenidate and pemoline; (118) antitussives, such as codeine; (119) bronchodilators, such as theophylline; (120) adrenergic agonist bronchodilators, such as albuterol; (121) respiratory corticosteroid anti-inflammatory agents, such as dexamethasone; (122) antidotes, such as flumazenil and naloxone; (123) heavy metal antagonists/chelating agents, such as penicillamine; (124) deterrent substance abuse agents, such as disulfiram, naltrexone, and nicotine; (125) withdrawal substance abuse agents, such as bromocriptine; (126) minerals, such as iron, calcium, and magnesium; (127) vitamin B compounds, such as cyanocobalamin (vitamin $B_{12}$) and niacin (vitamin $B_3$); (128) vitamin C compounds, such as ascorbic acid; and (129) vitamin D compounds, such as calcitriol.

In addition to the foregoing, the following less common drugs may also be used: chlorhexidine; estradiol cypionate in oil; estradiol valerate in oil; flurbiprofen; flurbiprofen sodium; ivermectin; levodopa; nafarelin; and somatropin.

Further, the following new drugs may also be used: recombinant beta-glucan; bovine immunoglobulin concentrate; bovine superoxide dismutase; the formulation comprising fluorouracil, epinephrine, and bovine collagen; recombinant hirudin (r-Hir), HIV-1 immunogen; human anti-TAC antibody; recombinant human growth hormone (r-hGH); recombinant human hemoglobin (r-Hb); recombinant human mecasermin (r-IGF-1); recombinant interferon beta-1a; lenograstim (G-CSF); olanzapine; recombinant thyroid stimulating hormone (r-TSH); and topotecan.

Further still, the following intravenous products may be used: acyclovir sodium; aldesleukin; atenolol; bleomycin sulfate, human calcitonin; salmon calcitonin; carboplatin; carmustine; dactinomycin, daunorubicin HCl; docetaxel; doxorubicin HCl; epoetin alfa; etoposide (VP-16); fluorouracil (5-FU); ganciclovir sodium; gentamicin sulfate; interferon alfa; leuprolide acetate; meperidine HCl; methadone HCl; methotrexate sodium; paclitaxel; ranitidine HCl; vinblastin sulfate; and zidovudine (AZT).

Still further, the following listing of peptides, proteins, and other large molecules may also be used, such as interleukins 1 through 18, including mutants and analogues; interferons α, β, and γ; luteinizing hormone releasing hormone (LHRH) and analogues, gonadatropin releasing hormone (GnRH), transforming growth factor-β (TGF-β); fibroblast growth factor (FGF); tumor necrosis factor-α & γ (TNF-α & β); nerve growth factor (NGF); growth hormone releasing factor (GHRF); epidermal growth factor (EGF); fibroblast growth factor homologous factor (FGFHF); hepatocyte growth factor (HGF); insulin growth factor (IGF); platelet-derived growth factor (PDGF); invasion inhibiting factor-2 (IIF-2); bone morphogenetic proteins 1–7 (BMP 1–7); somatostatin; thymosin-α-1; γ-globulin; superoxide dismutase (SOD); and complement factors.

The biologically active substances are used in amounts that are therapeutically effective. While the effective amount of a biologically active substance will depend on the particular material being used, amounts of the biologically active substance from about 1% to about 65% have been easily incorporated into the present delivery systems while achieving controlled release. Lesser amounts may be used to achieve efficacious levels of treatment for certain biologically active substances.

Pharmaceutically acceptable carriers may be prepared from a wide range of materials. Without being limited thereto, such materials include diluents, binders and adhesives, lubricants, disintegrants, colorants, bulking agents, flavorings, sweeteners and miscellaneous materials such as buffers and adsorbents in order to prepare a particular medicated composition.

In its simplest form, a biodegradable therapeutic agent delivery system consists of a dispersion of the therapeutic agent in a polymer matrix. The therapeutic agent is typically released as the polymeric matrix biodegrades in vivo into soluble products that can be excreted from the body.

In a particularly preferred embodiment, an article is used for implantation, injection, or otherwise placed totally or partially within the body, the article comprising the biodegradable polymer composition of the invention. The biologically active substance of the composition and the copolymer of the invention may form a homogeneous matrix, or the biologically active substance may be encapsulated in some way within the copolymer. For example, the biologically active substance may be first encapsulated in a microsphere and then combined with the copolymer in such a way that at least a portion of the microsphere structure is maintained. Alternatively, the biologically active substance may be sufficiently immiscible in the polymer of the invention that it is dispersed as small droplets, rather than being dissolved, in the polymer. Either form is acceptable, but it is preferred that, regardless of the homogeneity of the composition, the release rate of the biologically active substance in vivo remain controlled, at least partially as a function of hydrolysis of the phosphoester bond of the polymer upon biodegradation.

Biodegradability and Release Characteristics

As a drug delivery device, compositions made with the polymer of the invention are useful in providing a polymeric matrix capable of sequestering a biologically active substance and provide predictable, controlled delivery of the substance. In such cases, any remaining polymeric matrix can then degrade to non-toxic residues.

The polymer of formula I is preferably characterized by a release rate of a biologically active substance in vivo that is controlled at least in part as a function of hydrolysis of the phosphoester bond of the polymer during biodegradation. Additionally, the biologically active substance to be released may be conjugated to the phosphorus side chain R' to form a pendant drug delivery system.

Further, the structure of the side chain can influence the release behavior of compositions comprising a biologically active substance. For example, it is expected that conversion of the phosphate side chain to a more lipophilic, more hydrophobic or bulky group would slow down the degradation process. Thus, release is usually faster from polymer compositions with a small aliphatic group side chain than with a bulky aromatic side chain.

Further still, other factors such as molecular weight are also important. In general, the greater the molecular weight, the slower biodegradation will be. Accordingly, the greater the molecular weight that can be achieved, the more flexibility a medical device designer has in producing controlled release materials exhibiting the desired release profile. A prolonged release profile can be particularly important in these applications.

The following examples are illustrative of preferred embodiments of the invention and are not to be construed as limiting the invention thereto. All polymer molecular weights are average molecular weights. All percentages are based on the percent by weight of the final delivery system or formulation being prepared, unless otherwise indicated, and all totals equal 100% by weight.

EXAMPLES

Example 1
Synthesis of Two-stage Poly(BHDPT-EOP/TC) 100:50:50

To a 100-ml three-necked round flask were added sequentially 4.19 g of Bis(3-hydroxy-2,2-dimethylpropyl terephthalate) (BHDPT), 3.03 g of dimethylaminopyridine (DMAP), and 20 ml of dichloromethane under dry nitrogen gas. The mixture was stirred by a magnetic stirring bar until a clear solution was achieved. The flask was then chilled with dry ice for 10 minutes, and 1.01 g of ethyl dichlorophosphate (EOP) in 15 ml of dichloromethane was added through an addition funnel over 15 minutes. Terephthalate chloride in dichloromethane (1.26 g/15 ml) was slowly added 10 minutes later. The reaction mixture was then gradually heated up to reflux with a heating mantle and maintained under reflux overnight. The bulk of the solvent was then removed, with about 10 ml of solvent left to maintain a viscous reaction mixture. The polymerization was allowed to proceed for another 2 hours, and 100 ml of chloroform was added. The polymer solution was then washed 3 times with saturated NaCl solution, dried over anhydrous $MgSO_4$, and precipitated in 500 ml of ether.

Example 2
Comparison of Two-stage to One-stage P(BHDPT-EOP)

-continued

A. P(BHDPT-EOP) Synthesized by Two-stage Procedure:

To a 100-ml three-necked round flask were added 5.58 g of Bis(3-hydroxy-2,2-dimethylpropyl) terephthalate (BHDPT), 4.03 g of dimethylaminopyridine (DMAP), and 20 ml of dichloromethane sequentially under dry nitrogen gas. The mixture was stirred with a magnetic stirring bar until a clear solution was achieved. The flask was then chilled with dry ice for ten minutes, and a solution of an equimolar amount (2.69 g) of ethyl phosphorodichloridate (EOP) (distilled before use) in 15 ml of dichloromethane was added through an addition funnel over a fifteen-minute period. When addition was complete, the flask containing the reaction mixture was placed in a heating mantle and gradually heated up to reflux temperature. The reaction was maintained under reflux for two hours.

Then the bulk of the solvent was removed, leaving only about 10 ml of the solvent to maintain a viscous reaction mixture. The polymerization was then allowed to proceed for another two hours with stirring. For work-up of the product, 100 ml of chloroform was added to the reaction mixture, this chloroform solution was washed three times with a saturated NaCl solution and dried over anhydrous $MgSO_4$. The polymer product was precipitated out in 500 ml of ether. The resulting precipitate was filtered off and dried.

B. P(BHDPT-EOP) Synthesized by One-stage Procedure:

To a 100-ml three-necked round flask were added 5.64 g of Bis(3-hydroxy-2,2-dimethylpropyl) terephthalate (BHDPT), 4.08 g of dimethylaminopyridine (DMAP), and 20 ml of dichloromethane sequentially under dry nitrogen gas. The mixture was stirred with a magnetic stirring bar until a clear solution was achieved. The flask was then chilled with dry ice for ten minutes, and a solution of 2.72 g of ethyl phosphorodichloridate (EOP) (distilled before use) in 15 ml of dichloromethane was added through an addition funnel over a fifteen-minute period. When addition was complete, the flask containing the reaction mixture was placed in a heating mantle and gradually heated up to reflux temperature. The reaction was maintained under reflux overnight.

The solvent was then removed by distillation and replaced with about 100 ml of chloroform. The chloroform solution was washed three times with a saturated NaCl solution and dried over anhydrous $MgSO_4$. The polymer product was precipitated out in 500 ml of ether.

C. Comparison of Two-stage and One-stage Product

Figure 2:
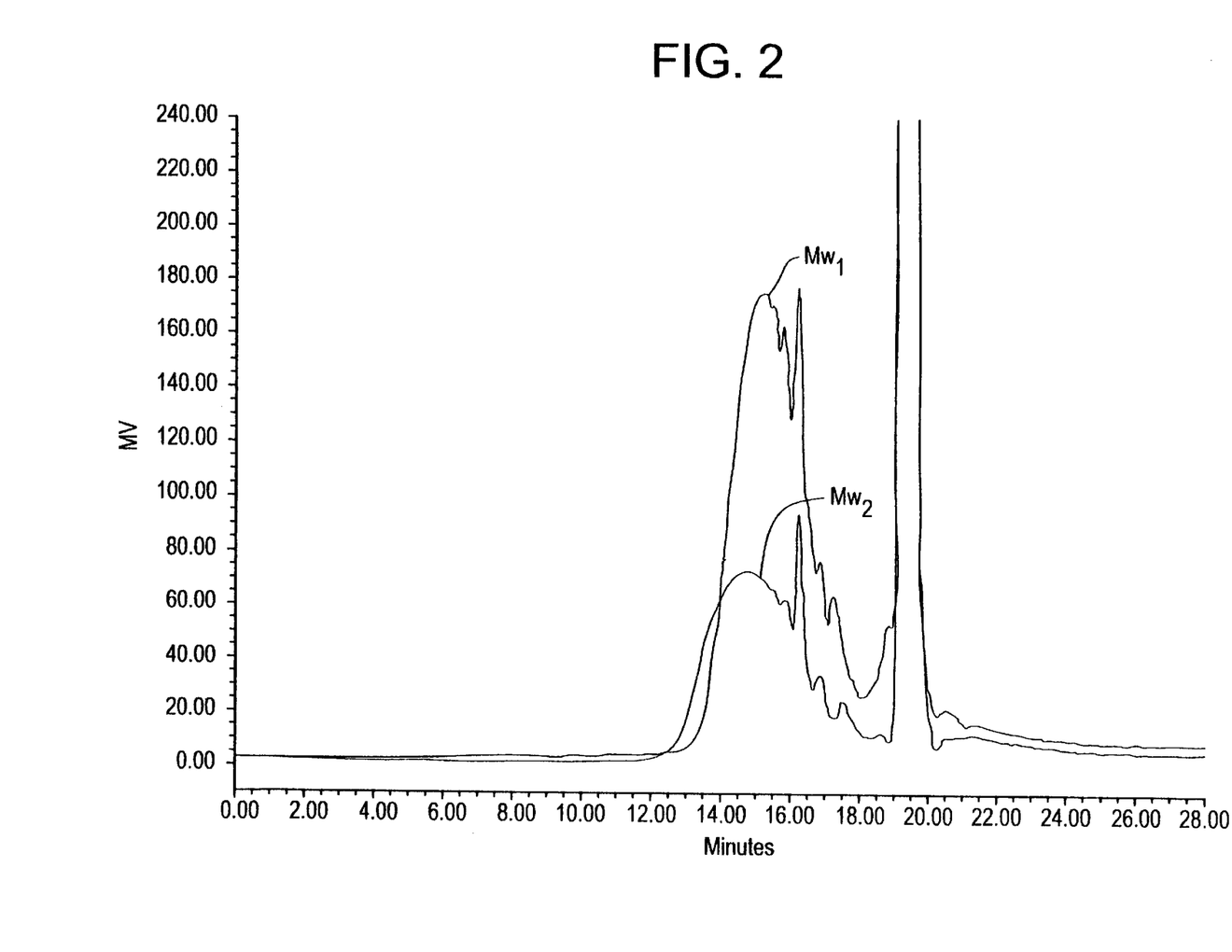
FIG. 2 shows a comparison GPC chromatogram, which contrasts $Mw_1$ and $Mw_2$ for a second synthesis of poly (BHDPT-EOP).

A sample of each poly(BHDPT-EOP) compound made above was analyzed by GPC to determine molecular weight, and the comparison chromatogram is shown in FIG. 2. The two-stage method led to a significantly higher $Mw_2$ of 8.2 kd, as compared to the $Mw_1$ obtained by the one-stage method (4.5 kd).

Example 3

Comparison of Two-stage to One-stage P(BHDPT-EOP/TC) (100:50:50)

A. Two-stage P(BHDPT-EOP/TC) (Molar Ratio:100:50:50):

To a 100-ml three-necked round flask were added 3.48 g of Bis(3-hydroxy-2,2-dimethylpropyl) terephthalate (BHDPT), 2.52 g of dimethylaminopyridine (DMAP), and 20 ml of dichloromethane sequentially under dry nitrogen gas. The mixture was stirred with a magnetic stirring bar until a clear solution was achieved. The flask was then chilled with dry ice for ten minutes, and a solution of 0.84 g of ethyl phosphorodichloridate (EOP) (distilled before use) in 15 ml of dichloromethane was added through an addition funnel over a fifteen-minute period. Ten minutes later, 1.05 g terephthalate chloride (TC) in 15 ml of dichloromethane was added dropwise to the flask over a ten-minute period. The reaction mixture was then gradually heated up to reflux temperature with a heating mantle. The reaction was maintained under reflux overnight (18 hours).

Then the bulk of the solvent was removed, leaving only about 10 ml of the solvent to maintain a viscous reaction mixture. The polymerization was then allowed to proceed for another two hours with stirring. For work-up of the product, 100 ml of chloroform was added to the reaction mixture, and the chloroform solution was washed three times with a saturated NaCl solution and dried over anhydrous $MgSO_4$. The polymer product was precipitated out in 500 ml of ether.

B. One-stage P(BHDPT-EOP/TC):

To a 100-ml three-necked round flask were added 3.48 g of Bis(3-hydroxy-2,2-dimethylpropyl) terephthalate (BHDPT), 2.52 g of dimethylaminopyridine (DMAP), and 20 ml of dichloromethane sequentially under dry nitrogen gas. The mixture was stirred with a magnetic stirring bar until a clear solution was achieved. The flask was then chilled with dry ice for ten minutes, and a solution of 0.84 g of ethyl phosphorodichloridate (EOP) (distilled before use) in 15 ml of dichloromethane was added through an addition funnel over a fifteen-minute period. Ten minutes later, 1.05 g of terephthalate chloride (TC) in 15 ml of dichloromethane was added dropwise to the flask over a ten-minute period. The reaction mixture was then gradually heated up to reflux temperature with a heating mantle and maintained under reflux overnight (18 hours).

The solvent was then removed and replaced with about 100 ml of chloroform. The chloroform solution was washed three times with a saturated NaCl solution and dried over anhydrous $MgSO_4$. The polymer product was precipitated out in 500 ml of ether.

C. Comparison of Two-stage and One-stage Product

Figure 3:
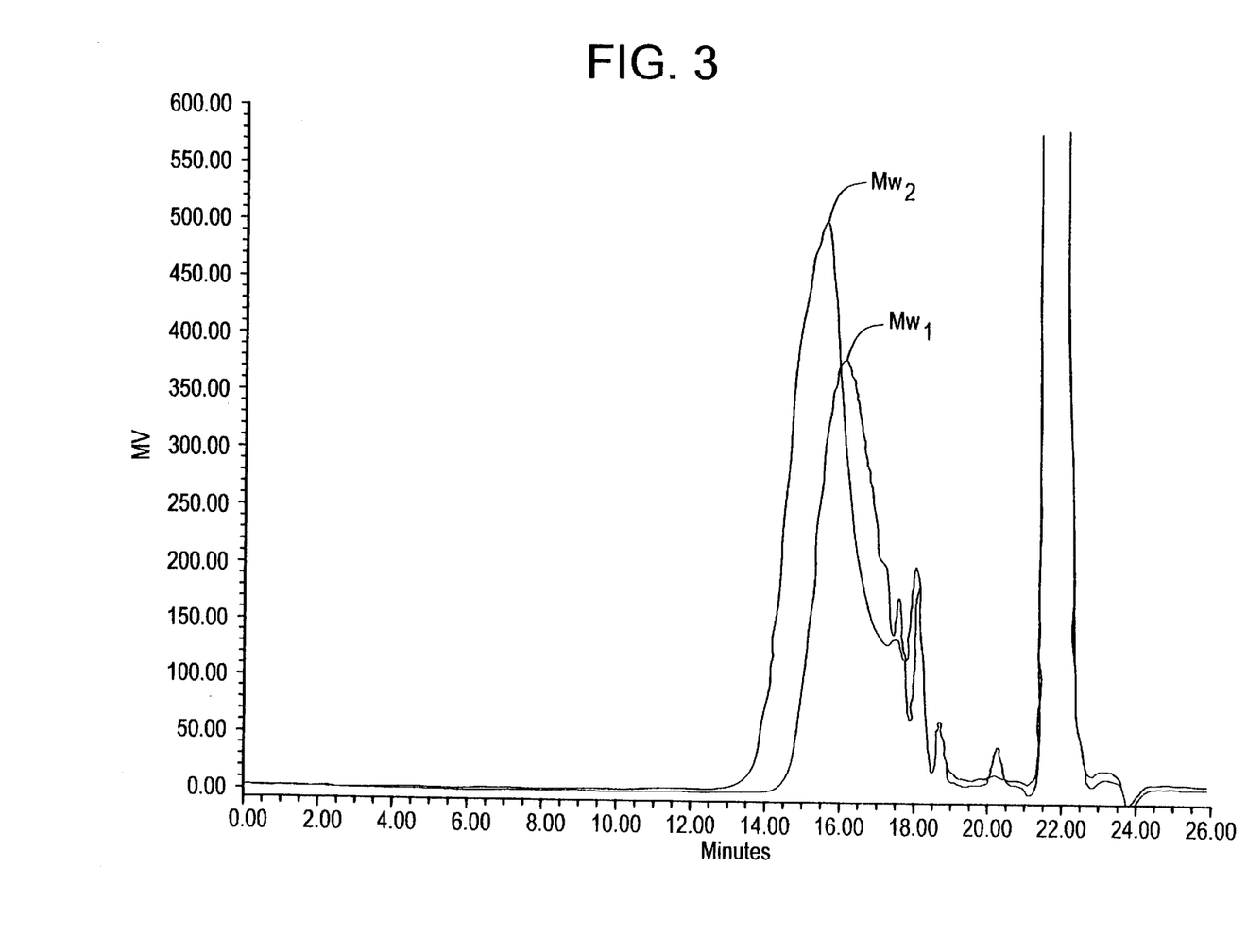
FIG. 3 shows a comparison GPC chromatogram, which contrasts $Mw_1$ and $Mw_2$ for poly(BHDPT-EOP/TC) (100:50:50).

A sample of each poly(BHDPT-EOP/TC) compound made above was analyzed by GPC to determine molecular weight, and the comparison chromatogram is shown in FIG. 3. The two-stage method led to a significantly higher $Mw_2$ of 18.6 kd, as compared to the $Mw_1$ obtained by the one-stage method (8.6 kd).

Example 4

Comparison of P(BHDPT-EOP/TC) (100:85:15)

A. Two-stage P(BHDPT-EOP/TC) (Molar Ratio:100:85:15):

To a 100-ml three-necked round flask were added 5.37 g of Bis(3-hydroxy-2,2-dimethylpropyl) terephthalate (BHDPT), 3.89 g of dimethylaminopyridine (DMAP), and 15 ml of dichloromethane sequentially under dry nitrogen gas. The mixture was stirred with a magnetic stirring bar until a clear solution was achieved. The flask was then chilled with dry ice for ten minutes, and a solution of 2.2 g of ethyl phosphorodichloridate (EOP) (distilled before use) in 15 ml of dichloromethane was added through an addition funnel over a fifteen-minute period. Ten minutes later, 0.48 g terephthalate chloride (TC) in 15 ml of dichloromethane was added dropwise to the flask over a ten-minute period. The reaction mixture was then gradually heated up to reflux temperature with a heating mantle. The reaction was maintained under reflux for two hours.

Then the bulk of the dichloromethane solvent (about 35 ml) was removed, resulting in a viscous reaction mixture. The polymerization was then allowed to proceed for another two hours with stirring. For work-up of the product, 100 ml of chloroform was added to the reaction mixture, and the chloroform solution was washed three times with a saturated NaCl solution and dried over anhydrous MgSO$_4$. The polymer product was precipitated out in 500 ml of ether.

B. One-stage P(BHDPT-EOP/TC) at Molar Ratio of (100:85:15):

To a 100-ml three-necked round flask were added 5.59 g of Bis(3-hydroxy-2,2-dimethylpropyl) terephthalate (BHDPT), 4.03 g of dimethylaminopyridine (DMAP), and 18 ml of dichloromethane sequentially under dry nitrogen gas. The mixture was stirred with a magnetic stirring bar until a clear solution was achieved. The flask was then chilled with dry ice for ten minutes, and a solution of 2.29 g of ethyl phosphorodichloridate (EOP) (distilled before use) in 15 ml of dichloromethane was added through an addition funnel over a fifteen-minute period. Ten minutes later, 0.50 g of terephthalate chloride (TC) in 15 ml of dichloromethane was added dropwise to the flask over a ten-minute period. The reaction mixture was then gradually heated up to reflux temperature with a heating mantle and maintained under reflux overnight (18 hours).

The solvent was then distilled off and replaced with about 100 ml of chloroform. The chloroform solution was washed three times with a saturated NaCl solution and dried over anhydrous MgSO$_4$. The polymer product was precipitated out in 500 ml of ether.

C. Comparison of Two-stage and One-stage Product

Figure 4:
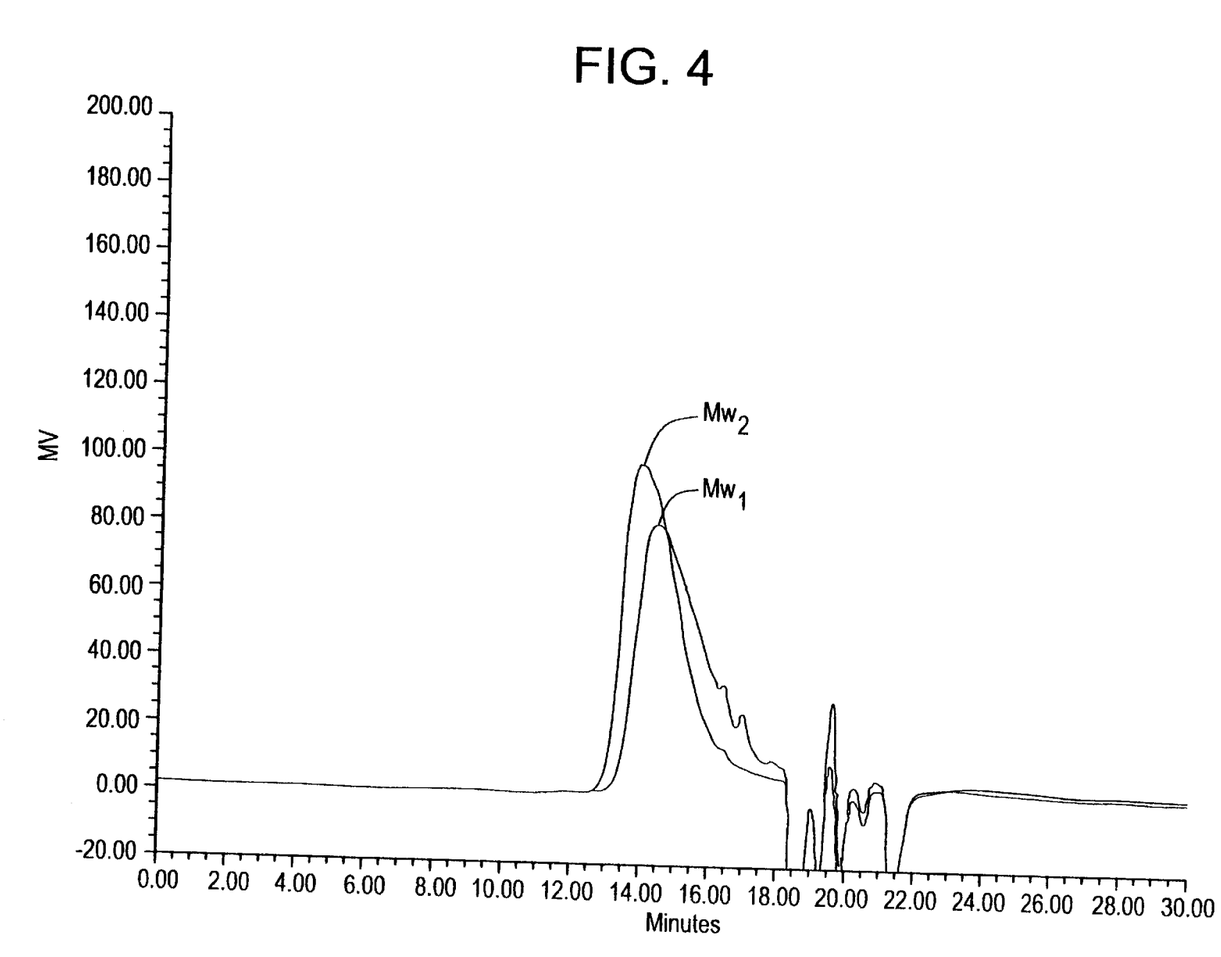
FIG. 4 shows a comparison GPC chromatogram, which contrasts $Mw_1$ and $Mw_2$ for poly(BHDPT-EOP/TC) (100:85:15).

A sample of each poly(BHDPT-EOP/TC) (100:85:15) compound made above was analyzed by GPC to determine molecular weight, and the comparison chromatogram is shown in FIG. 4. The two-stage method led to a significantly higher Mw$_2$ of 13.7 kd, as compared to the Mw$_1$ obtained by the one-stage method (8.4 kd).

Summary of Comparisons

Figure 1:
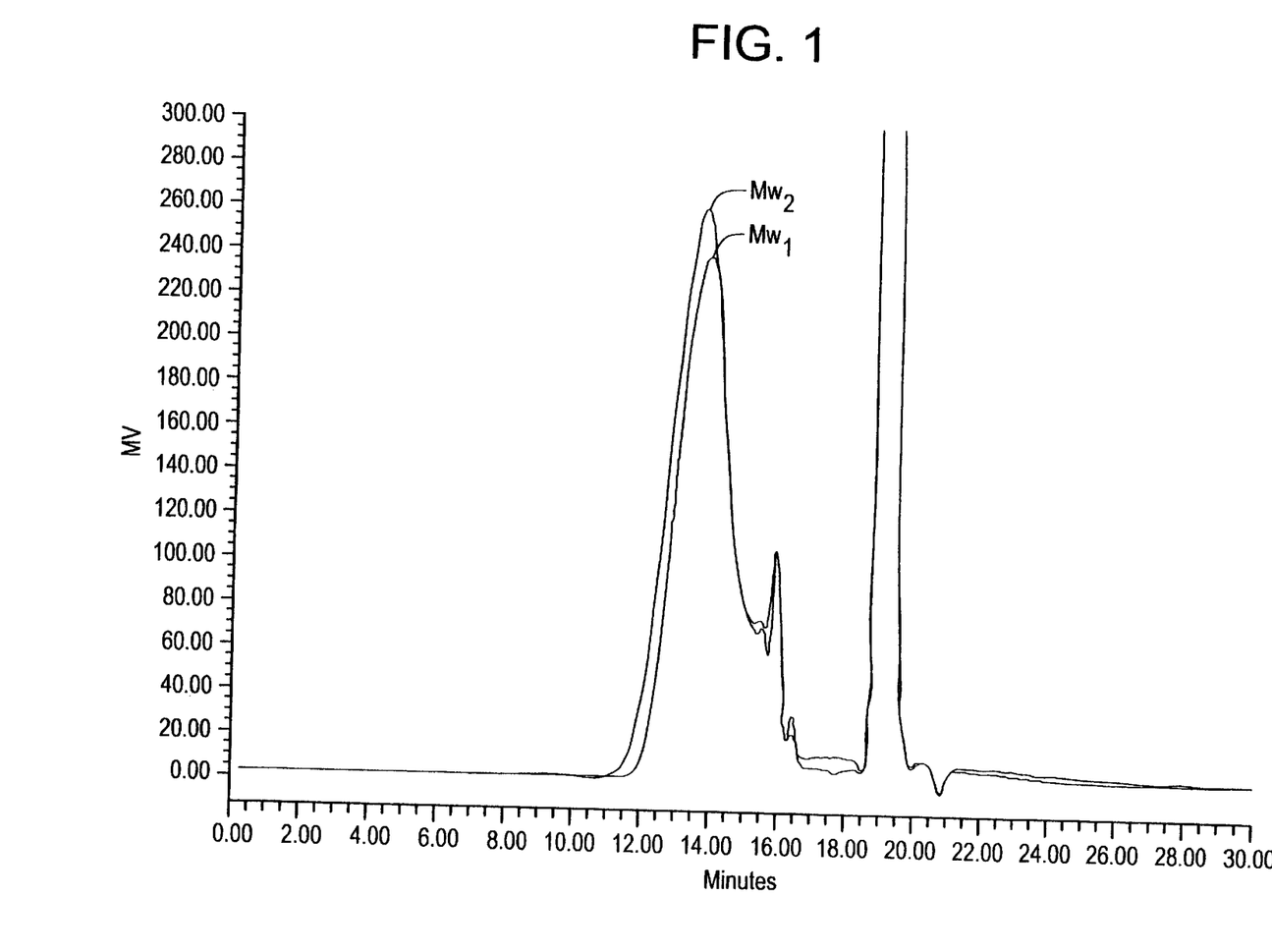
FIG. 1 shows a comparison GPC chromatogram, which contrasts $Mw_1$ and $Mw_2$ for poly(BHDPT-EOP).

A one-stage product corresponding to the polymer of Example 1, in accordance with the one-stage procedures described in Examples 2–4, was also run as a control, and the resulting chromatogram is shown in FIG. 1. The results of all four comparisons are summarized below, with all molecular weight values being determined by GPC and calibrated against a monodisperse polystyrene standard.

| Polymer | One-stage Polymerization Mw$_1$ | Two-stage Polymerization Mw$_2$ |
| --- | --- | --- |
| Example 1: Poly(BHDPT-EOP/TC) (100:50:50) | 16.6 kd | 21.1 kd |
| Example 2: Poly(BHDPT-EOP) | 4.5 kd | 8.2 kd |
| Example 3: Poly(BHDPT-EOP/TC) (100:50:50) | 8.6 kd | 18.6 kd |
| Example 4: Poly(BHDPT-EOP/TC) (100:85:15) | 8.4 kd | 13.7 kd |

The results show that Mw$_2$ is significantly higher than the Mw$_1$ values for each polymer tested. The invention being thus described, it will be obvious that the same may be varied in many ways. Such variations are not to be regarded as a departure from the spirit and scope of the invention, and all such modifications are intended to be included within the scope of the following claims.

We claim:

1. A process for preparing a phosphoester polymer comprising the recurring monomeric units of formula I:

wherein:

X is —O— or —NR″—, where R″ is H or alkyl;

L is a divalent organic moiety;

R' is H, alkyl, alkoxy, aryl, aryloxy, heterocyclic, or heterocycloxy; and n is between about 25 to 2,000, said process comprising the steps of:

(a) polymerizing in the presence of a solvent p moles of a di-XH compound having formula II:

wherein X and L are as defined above, with q moles, where p≈q, of a phosphorodihalo compound of formula III:

wherein R' is defined as above and "halo" is Br, Cl or I, to form a polymer of formula I, wherein n is about 12 to 1000, having a first molecular weight Mw$_1$, wherein said solvent is present in an amount greater than about 5 ml of solvent per gram of compound of formula II;

(b) removing at least about 25% of the solvent to form a more concentrated reaction mixture; and

(c) further polymerizing said concentrated reaction mixture for an additional time sufficient to produce a polymer of formula I where n is between about 25 and 2,000, said polymer having a second molecular weight Mw$_2$, which is significantly higher than Mw$_1$.

2. The process of claim 1 wherein X is —O—.

3. The process of claim 1 wherein L comprises an aromatic ring, an aliphatic ring, a straight-chain or branched aliphatic group, or a carbonyl group.

4. The process of claim 1 wherein L is selected from the group consisting of:

—R—cycloaliphatic—R—;

-continued and wherein R is branched or straight-chain alkylene and R''' is H, alkyl, aryl or heterocyclyl.

5. The process of claim 1 wherein R' is an alkoxy group.

6. The process of claim 1 wherein the amount of solvent in polymerization step (a) is about 5–15 ml per gram of compound of formula II.

7. The process of claim 1 wherein said polymerization step (a) takes place at a temperature about —40° C. to 150° C.

8. The process of claim 1 wherein said polymerization step (a) takes place during a time between about 30 minutes and 24 hours.

9. The process of claim 1 wherein an acid acceptor is present during said polymerization step (a).

10. The process of claim 9 wherein the acid acceptor is a tertiary amine.

11. The process of claim 1 wherein said polymerization step (c) takes place at a temperature between about room temperature and 100° C.

12. The process of claim 1 wherein said polymerization step (c) takes place during a time of about 30 minutes to 10 hours.

13. The process of claim 1 wherein the amount of solvent used in polymerization step (c) is about 1–5 ml per gram of compound of formula II used in polymerization step (a).

14. The process of claim 1 wherein said polymer of formula I is purified by quenching a solution of the polymer with a non-solvent or a partial solvent.

15. The process of claim 1 wherein $Mw_2$ is at least 25% greater than $Mw_1$.

16. The process of claim 1 wherein $Mw_2$ is at least 50% greater than $Mw_1$.

17. The polymer of claim 1 wherein $Mw_2$ is at least 100% greater than $Mw_1$.

18. The process of claim 1 wherein said process is conducted on a batchwise basis.

19. The process of claim 1 wherein said process is continuous.

20. A high molecular weight phosphoester polymer comprising the recurring monomeric units of formula I:

wherein:

X is —O— or —NR''—, where R'' is H or alkyl;

L is a divalent organic moiety;

R' is H, alkyl, alkoxy, aryl, aryloxy, heterocyclic, or heterocycloxy; and n is between about 25 to 2,000, wherein said polymer is made by a process comprising the steps of:

(a) polymerizing in the presence of a solvent p moles of a di-XH compound having formula II:

II wherein X and L are as defined above, with q moles, where p≈q, of a phosphorodihalo compound of formula III:

III wherein R' is defined as above and "halo" is Br, Cl or I, to form a polymer of formula I, wherein n is about 12 to 1000, having a first molecular weight $Mw_1$, wherein said solvent is present in an amount greater than about 5 ml of solvent per gram of compound of formula II;

(b) removing at least about 25% of the solvent to form a more concentrated reaction mixture; and (c) further polymerizing said concentrated reaction mixture for an additional time sufficient to produce a polymer of formula I where n is between about 25 and 2,000, said polymer having a second molecular weight $Mw_2$, which is significantly higher than $Mw_1$.

21. The polymer of claim 20 wherein X is —O—.

22. The polymer of claim 20 wherein L comprises an aromatic ring, an aliphatic ring, a straight-chain or branched aliphatic group, or a carbonyl group.

23. The polymer of claim 20 wherein L is selected from the group consisting of:

and wherein R is branched or straight-chain alkylene and R''' is H, alkyl, aryl or heterocyclyl.

24. The polymer of claim 20 wherein R' is an alkoxy group.

25. The polymer of claim 20 wherein the amount of solvent in polymerization step (a) is about 5–15 ml per gram of compound of formula II.

26. The polymer of claim 20 wherein said polymerization step (a) takes place at a temperature about –40° C. to 150° C.

27. The polymer of claim 20 wherein said polymerization step (a) takes place during a time between about 30 minutes and 24 hours.

28. The polymer of claim 20 wherein an acid acceptor is present during said polymerization step (a).

29. The polymer of claim 20 wherein the acid acceptor is a tertiary amine.

30. The polymer of claim 20 wherein said polymerization step (c) takes place at a temperature between about room temperature and 100° C.

31. The polymer of claim 20 wherein said polymerization step (c) takes place during a time of about 30 minutes to 10 hours.

32. The polymer of claim 20 wherein the amount of solvent used in polymerization step (c) is about 1–5 ml per gram of compound of formula II used in polymerization step a.

33. The polymer of claim 20 wherein said polymer of formula I is purified by quenching a solution of said polymer with a non-solvent or a partial solvent.

34. The polymer of claim 20 wherein $Mw_2$ is at least 25% greater than $Mw_1$.

35. The polymer of claim 20 wherein $Mw_2$ is at least 50% greater than $Mw_1$.

36. The polymer of claim 20 wherein $Mw_2$ is at least 100% greater than $Mw_1$.

37. The polymer of claim 20 wherein said process is carried out on a batchwise basis.

38. The polymer of claim 20 wherein said process is continuous.

* * * * *